United States Patent
Rost et al.

(10) Patent No.: US 11,627,493 B2
(45) Date of Patent: Apr. 11, 2023

(54) SUPPORTING THE FULFILMENT OF E2E QOS REQUIREMENTS IN TSN-3GPP NETWORK INTEGRATION

(71) Applicant: Nokia Solutions and Networks GmbH & Co. KG, Munich (DE)

(72) Inventors: Peter Rost, Heidelberg (DE); Borislava Gajic, Unterhaching (DE); Christian Mannweiler, Munich (DE); Christian Markwart, Munich (DE); Andreas Maeder, Wurzburg (DE); Rakash Sivasiva Ganesan, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 1 day.

(21) Appl. No.: 17/267,893

(22) PCT Filed: Aug. 13, 2018

(86) PCT No.: PCT/EP2018/071936
§ 371 (c)(1),
(2) Date: Feb. 11, 2021

(87) PCT Pub. No.: WO2020/035127
PCT Pub. Date: Feb. 20, 2020

(65) Prior Publication Data
US 2021/0204172 A1    Jul. 1, 2021

(51) Int. Cl.
*H04W 28/10* (2009.01)
*H04L 41/50* (2022.01)
(Continued)

(52) U.S. Cl.
CPC ............. *H04W 28/10* (2013.01); *H04L 41/50* (2013.01); *H04L 47/20* (2013.01); *H04L 47/24* (2013.01); *H04W 80/02* (2013.01)

(58) Field of Classification Search
None
See application file for complete search history.

(56) References Cited

U.S. PATENT DOCUMENTS

| 7,440,430 B1 | 10/2008 | Jagadeesan et al. ........... 370/331 |
| 2008/0310324 A1* | 12/2008 | Chaponniere ......... H04W 28/12 370/254 |

(Continued)

FOREIGN PATENT DOCUMENTS

| CN | 101039325 A | 9/2007 |
| CN | 108141875 A | 6/2018 |

OTHER PUBLICATIONS

Pop, Paul, et al., "Design optimization of cyber-physical distributed systems using IEEE time-sensitive networks", The Institution of Engineering and Technology Journals, Dec. 31, 2016, 9 pgs.

(Continued)

*Primary Examiner* — Gerald A Smarth
(74) *Attorney, Agent, or Firm* — Joseph C. Drish; Harrington & Smith

(57) ABSTRACT

A method including obtaining parameters for a flow from a first network through a second network, the parameters including: a maximum protocol data unit volume $PDUV_{max}$ in the first network, a maximum flow bit rate MFBR in the second network, a guaranteed flow bit rate GFBR in the second network, and a maximum protocol data unit delay budget in the second network; deriving from the obtained parameters: a maximum delay a packet of the flow experiences in the second network, wherein the maximum delay is a sum of a maximum $PDUV_{max}$ dependent contribution and a maximum $PDUV_{max}$ independent contribution, a minimum delay the packet experiences in the second network, wherein the minimum delay is a sum of a minimum $PDUV_{max}$ dependent contribution and a minimum $PDUV_{max}$ independent contribution.

16 Claims, 6 Drawing Sheets

(51) Int. Cl.
*H04L 47/20* (2022.01)
*H04L 47/24* (2022.01)
*H04W 80/02* (2009.01)

(56) References Cited

U.S. PATENT DOCUMENTS

| | | | |
|---|---|---|---|
| 2009/0270097 A1 | 10/2009 | Gallagher et al. | ......... 455/435.1 |
| 2015/0110006 A1 | 4/2015 | Avula et al. | |
| 2017/0332282 A1* | 11/2017 | Dao | ...................... H04L 1/0026 |
| 2018/0152966 A1* | 5/2018 | Goldhamer | ......... H04W 74/002 |

OTHER PUBLICATIONS

Neumann, Arne, et al., "Towards integration of industrial ethernet with 5G mobile networks", IEEE, Jun. 13, 2018, abstract only, 1 pg.
Nasrallah, Ahmed, et al., "Ultra-low latency (ULL) networks: The IEEE TSN and IETF DetNet standards and related 5G Ull research", Mar. 20, 2018, abstract only, 2 pgs.
Finn, N., et al., "Deterministic Networking Architecture draft-finn-detnet-architecture-07", DetNet Internet Draft, expires Jan. 26, 2017, 21 pgs.
Cao, Jingyue, et al., "Independent WCRT analysis for individual priority classes in Ethernet AVB", Real-Time Systems (2018), 51 pgs.
"Decision and handling of late arriving requests", Alcatel-Lucent, 3GPP TSG CT4 Meeting #70, C4-151389, Aug. 2015, 31 pages.
Cao, Jingyue, et al., "Independent yet Tight WCRT Analysis for Individual Priority Classes in Ethernet AVB", RTNS' 16, Oct. 2016, pp. 55-64.

\* cited by examiner

US 11,627,493 B2

SUPPORTING THE FULFILMENT OF E2E QOS REQUIREMENTS IN TSN-3GPP NETWORK INTEGRATION

CROSS REFERENCE TO RELATED APPLICATION

This patent application is a U.S. National Stage application of International Patent Application Number PCT/EP2018/071936 filed Aug. 13, 2018, which is hereby incorporated by reference in its entirety.

FIELD OF THE INVENTION

The present invention relates to an apparatus, a method, and a computer program product related to transparent integration of a wireless network (e.g. a 3GPP network) into a wireline network (e.g. a TSN network) with time deterministic traffic.

BACKGROUND OF THE INVENTION

Time sensitive networking (TSN) [1] is being standardized by IEEE (Institute of Electrical and Electronics Engineers) 802.1 to provide industrial networks with deterministic delay to handle time sensitive traffic. Currently, wired links are assumed for connecting the sensors and controllers. Moving from wired to wireless sensors and actuators provide advantages, such as mobility, scalability, low cost maintenance etc. To connect the wireless devices to a TSN network, wireless transmission mechanisms such as defined in 3GPP (3$^{rd}$ Generation Partnership Project) are necessary.

FIG. 1 shows the entities involved in TSN. One of the key consideration for TSN standardization is to have a centralized entity, named CNC (Centralized Network Controller), which collects the requirements of end to end communication between the Talker End Stations and Listener End Stations and performs scheduling centrally. The Bridges learn the connection information for their immediate network peer in each physical port using the link layer discovery protocol (LLDP). Each TSN network has a single CNC. In addition, there might be multiple centralized user configurators (CUCs) which translate the requirements of the end to end communication and communicate it to the CNC. Furthermore, the CUC is responsible for configuring the respective Talker and Listener End Stations with transmission parameters computed by the CNC during the scheduling process. The solid arrows in FIG. 1 describe the main steps 1-6 involved in establishing a communication between a Talker and a Listener End Station [2].

Namely, according to 1), CUC obtains the stream Quality of Service (QoS) requirements from the end stations. Then, according to 2) CUC provides the stream QoS requirements to CNC. In 3a) CNC calculates schedules, paths etc. (hereinafter summarized as "schedule") in order to fulfil the stream QoS requirements, which are reported to CUC in 3b). In 4a) and 4b), CUC configures, via CNC, the managed objects of the bridges accordingly. CNC informs in 4c) CUC about successful configuration of the bridges. Namely, Stream Trans. Info contains the configuration parameters that the Talker End Station needs to use e.g. destination MAC address, VLAN ID and PCP field. It also has the transmit time window in which the Talker should transmit and the receive time window in which the listener should expect to receive the packets. Then, in 5) CUC configures the end stations accordingly. In parallel, as shown by dashed lines in FIG. 1, network discovery procedures run between related entities (i.e., between neighboured bridges, between each bridge and CNC, and between each station and the respective bridge it is connected to). After that, in 6), transmission between talker end stations and listener end stations may be performed.

Note that the bridges are time-aware in a TSN network. There may be one or more bridges between a talker end station and a respective listener end station. In FIG. 1, two bridges are shown as an example. Each talker end station may talk to one or more listener end stations, and each listener end station may listen to one or more talker end stations. A listener end station of one communication may be a talker end station of another communication.

Currently, in industries, TSN is used as a mechanism to provide end to end connectivity with deterministic capacity and delay. The talkers (e.g., sensors, controllers) and listeners (e.g. controllers, actuators) are connected through bridges using cables.

Time sensitive networking (TSN) [1] is currently standardized as the mechanism for communication within industrial networks. A set of IEEE 802.1 protocols [3] (IEEE 802.1AS-Rev, 802.1CB, 802.1Qcc, 802.1Qch, 802.1Qci, 802.1Qcj, 802.1CM, 802.1Qcp, 802.1Qcr, 802.1AB) is applied to achieve deterministic data transmission with guaranteed low latency with time-aware devices (which need to be configured properly).

3GPP started in 2017 a study on communication for Automation in Vertical Domains to identify respective requirements for wireless communication [4], [5]. So far, neither 3GPP Rel. 15 nor Rel. 16 include solutions on integrating 3GPP networks with TSN.

REFERENCES

[1] R. Hummen, S. Kehrer, O. Kleineberg, "TSN—Time Sensitive Networking", White Paper, Hirschmann
[2] IEEE 802.1Qcc, Stream Reservation Protocol (SRP) Enhancements and Performance Improvements, http://www.ieee802.org/1/pages/802.1cc.html
[3] http://www.ieee802.org/1/
[4] 3GPP, TS 23.501 V15.0.0 "System Architecture for the 5G System; Stage 2 (Release 15)", December 2017
[5] 3GPP TR 22.804 V1.0.0 "Study on Communication for Automation in Vertical Domains (Release 16)", December 2017
[6] PCT/EP2018/054916
[7] E. Gardiner et al., "Theory of Operation for TSN-enabled Systems applied to Industrial Markets", Avnu Alliance, 2017
[8] PCT/EP2018/061892
[9] 3GPP TS 36.881 v14.0.0 "Study on latency reduction techniques for LTE", July 2016

SUMMARY OF THE INVENTION

It is an object of the present invention to improve the prior art.

According to a first aspect of the invention, there is provided an apparatus, comprising means for obtaining configured to obtain following parameters for a flow from a first network through a second network:
  a maximum protocol data unit volume PDUV$_{max}$ of the flow in the first network;
  a maximum flow bit rate MFBR of the flow in the second network;
  a guaranteed flow bit rate GFBR of the flow in the second network; and a maximum protocol data unit delay budget $PDB_{max}$ of the flow in the second network;
a minimum protocol data unit delay budget $PDB_{min}$ of the flow in the second network;
means for deriving configured to derive from the obtained parameters at least one of:
a maximum delay $\tau_{max}$ a packet of the flow experiences in the second network, wherein the maximum delay is a sum of a maximum $PDUV_{max}$ dependent contribution and a maximum $PDUV_{max}$ independent contribution $\beta_{max}$;
a minimum delay $\tau_{min}$ the packet of the flow experiences in the second network, wherein the minimum delay is a sum of a minimum $PDUV_{max}$ dependent contribution and a minimum $PDUV_{max}$ independent contribution $\beta_{min}$;
means for providing configured to provide an indication of the at least one of the maximum $PDUV_{max}$ dependent contribution, the minimum $PDUV_{max}$ dependent contribution, the maximum $PDUV_{max}$ independent contribution to the first network, and the minimum $PDUV_{max}$ independent contribution to the first network.

The means for obtaining may be further configured to obtain:
a source address of the flow in the second network;
a destination address of the data flow in the second network;
the means for deriving may be further configured to derive:
an ingress port of the flow in the first network, wherein the ingress port corresponds to the source address according to a stored relationship;
an egress port of the flow in the first network, wherein the egress port corresponds to the destination address according to the stored relationship;
the means for providing may be configured to provide, to the first network, an indication of at least one of the ingress port and the egress port along with the indication of the at least one of the maximum $PDUV_{max}$ dependent contribution, the minimum $PDUV_{max}$ dependent contribution, the maximum $PDUV_{max}$ independent contribution, and the minimum $PDUV_{max}$ independent contribution.

The apparatus may further comprise means for classifying configured to classify the derived at least one of the maximum $PDUV_{max}$ dependent contribution, the minimum $PDUV_{max}$ dependent contribution, the maximum $PDUV_{max}$ independent contribution, and the minimum $PDUV_{max}$ independent contribution into one of a plurality of predefined quality of service classes of the second network; wherein the indication of the at least one of the maximum $PDUV_{max}$ dependent contribution, the minimum $PDUV_{max}$ dependent contribution, the maximum $PDUV_{max}$ independent contribution, and the minimum $PDUV_{max}$ independent contribution to the first network comprises an indication of the one of the plurality of predefined quality of service classes.

The means for deriving may be configured to derive the at least one of the maximum delay $\tau_{max}$ and the minimum delay $\tau_{min}$ according to the respective formula:

$$\tau_{max} = 1/GFBR * PDUV_{max} = \beta_{max};$$

$$\tau_{max} = PDB_{max};$$

$$\tau_{min} = 1/MFBR * PDUV_{max} = \beta_{min};$$

$$\tau_{min} = PDB_{min},$$

such that the maximum $PDUV_{max}$ dependent contribution is $1/GFBR * PDUV_{max}$, the minimum $PDUV_{max}$ dependent contribution is $1/MFBR * PDUV_{max}$, the maximum $PDUV_{max}$ independent contribution is $\beta_{max}$, and the minimum $PDUV_{max}$ independent contribution is $\beta_{min}$.

At least one of GFBR, $PDUV_{max}$, $\beta_{max}$, $\beta_{min}$, MFBR, $PDB_{max}$, and $PDB_{min}$ may be predefined, independent from the flow.

The obtaining means may be configured to obtain at least one of GFBR, $PDUV_{max}$, $\beta_{max}$, $\beta_{min}$, MFBR, $PDB_{max}$, and $PDB_{min}$ for the flow from the respective network.

The following equations may be satisfied: $PDB_{max} = PDB_{min}$ and $\beta_{max} = \beta_{min}$.

According to a second aspect of the invention, there is provided an apparatus, comprising means for checking configured to check if a quality of service profile of a flow comprises an indication to control latency including an address of a mapping function; means for monitoring configured to monitor if a latency requirement set in the quality of service profile is not fulfilled for the flow; means for informing configured to inform the mapping function that the requirement is not fulfilled if the quality of service profile comprises the indication and the requirement is not fulfilled.

The means for informing may be further configured to inform the mapping function on at least one of an amount of a deviation from the requirement and a reason for the deviation.

According to a third aspect of the invention, there is provided an apparatus, comprising means for monitoring configured to monitor in a wireless network if an indication is received for a flow; means for selecting configured to select a policy for the flow according to the indication if the indication is received, wherein the indication indicates at least one of the following:
the flow carries time sensitive traffic;
a maximum protocol data unit volume dependent contribution of an admissible latency of the flow;
a minimum protocol data unit volume dependent contribution of the admissible latency of the flow;
a maximum protocol data unit volume independent contribution of the admissible latency of the flow; and
a minimum protocol data unit volume independent contribution of the admissible latency of the flow.

A quality of service profile for the flow may comprise the indication.

According to a fourth aspect of the invention, there is provided a method, comprising
obtaining following parameters for a flow from a first network through a second network:
a maximum protocol data unit volume $PDUV_{max}$ of the flow in the first network;
a maximum flow bit rate MFBR of the flow in the second network;
a guaranteed flow bit rate GFBR of the flow in the second network; and
a maximum protocol data unit delay budget $PDB_{max}$ of the flow in the second network;
a minimum protocol data unit delay budget $PDB_{min}$ of the flow in the second network;
deriving from the obtained parameters at least one of:
a maximum delay $\tau_{max}$ a packet of the flow experiences in the second network, wherein the maximum delay is a sum of a maximum $PDUV_{max}$ dependent contribution and a maximum $PDUV_{max}$ independent contribution $\beta_{max}$;

a minimum delay $\tau_{min}$ the packet of the flow experiences in the second network, wherein the minimum delay is a sum of a minimum $PDUV_{max}$ dependent contribution and a minimum $PDUV_{max}$ independent contribution $\beta_{min}$;

providing an indication of the at least one of the maximum $PDUV_{max}$ dependent contribution, the minimum $PDUV_{max}$ dependent contribution, the maximum $PDUV_{max}$ independent contribution to the first network, and the minimum $PDUV_{max}$ independent contribution to the first network.

According to a fifth aspect of the invention, there is provided a method, comprising checking if a quality of service profile of a flow comprises an indication to control latency including an address of a mapping function; monitoring if a latency requirement set in the quality of service profile is not fulfilled for the flow; informing the mapping function that the requirement is not fulfilled if the quality of service profile comprises the indication and the requirement is not fulfilled.

According to a sixth aspect of the invention, there is provided a method, comprising monitoring in a wireless network if an indication is received for a flow; selecting a policy for the flow according to the indication if the indication is received, wherein the indication indicates at least one of the following:

the flow carries time sensitive traffic;
a maximum protocol data unit volume dependent contribution of an admissible latency of the flow;
a minimum protocol data unit volume dependent contribution of the admissible latency of the flow;
a maximum protocol data unit volume independent contribution of the admissible latency of the flow; and
a minimum protocol data unit volume independent contribution of the admissible latency of the flow.

Each of the methods of the fourth to sixth aspects may be a method of integrating a wireless network into a wireline network.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
3GPP QoS parameters and TSN delay parameters are appropriately mapped to each other;
TSN delay parameters may be updated according to the actual load in the 3GPP network;
modifications to the TSN network and the 3GPP network are not required.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The first part of the following description is substantially taken from PCT/EP2018/054916 and PCT/EP2018/061892, which are in their entirety incorporated by reference. The present application provides an improvement over this former application and also over PCT/EP2018/061892 in terms of appropriate mapping of the 3GPP QoS parameters to the TSN delay parameters and vice versa.

In a main target scenario, the tactile industrial network, also known as Industrial IoT (IIoT) or Industry 4.0 networks, 3GPP technologies are applied in addition to wired time sensitive networking (TSN) in industrial environments to provide flexibility (in terms of mobility) and scalability (in terms of number of sensors or actuators).

The introduction of wireless devices provides more flexibility, cost effectiveness and scalability in the system, but requires for example a wireless network as defined by 3GPP to provide predictable QoS for the communication. TSN and 3GPP networks are developed and standardized as two disjoint domains which are managed independently. To support a wireless connection based on 3GPP technology, only either of these two standards is supported in a network. There are no over-arching entities or concepts developed in order to handle the interaction between these two domains.

A TSN End Station "A" communicates with a TSN End Station "B" via a time sensitive communication link of a TSN Network to use a wireless communication service based on 3GPP technologies. A TSN Translator and a TSN Translator Client, which acts on behalf of the TSN Translator integrate a 3GPP network into the TSN network domain in a transparent manner. I.e., to the TSN network, the wireless communication service of a 3GPP network acts similar to a TSN bridge, while the TSN network acts as a data service to the 3GPP network.

Figure 1:
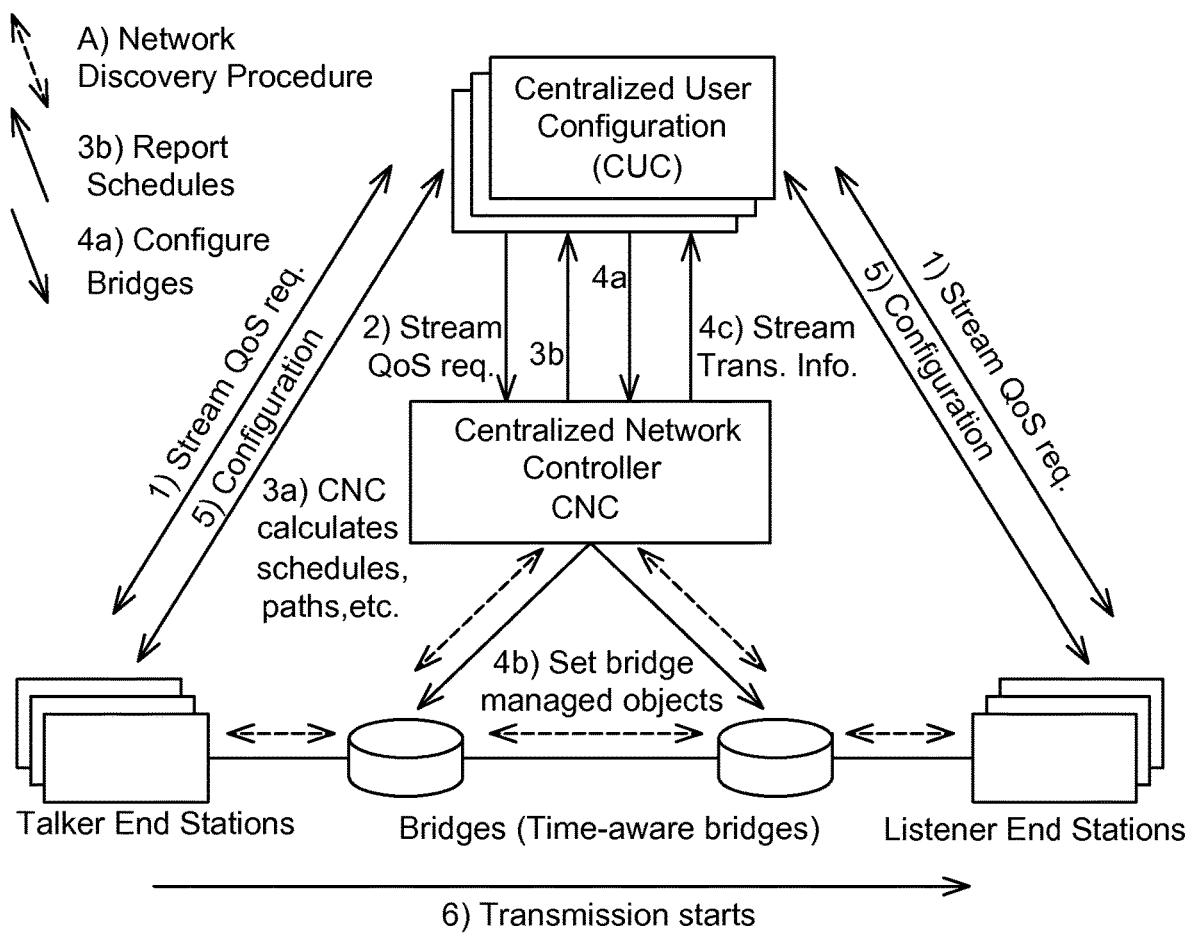
FIG. 1 shows a functional and simplified diagram of a TSN network including a flow of commands.
Figure 2:
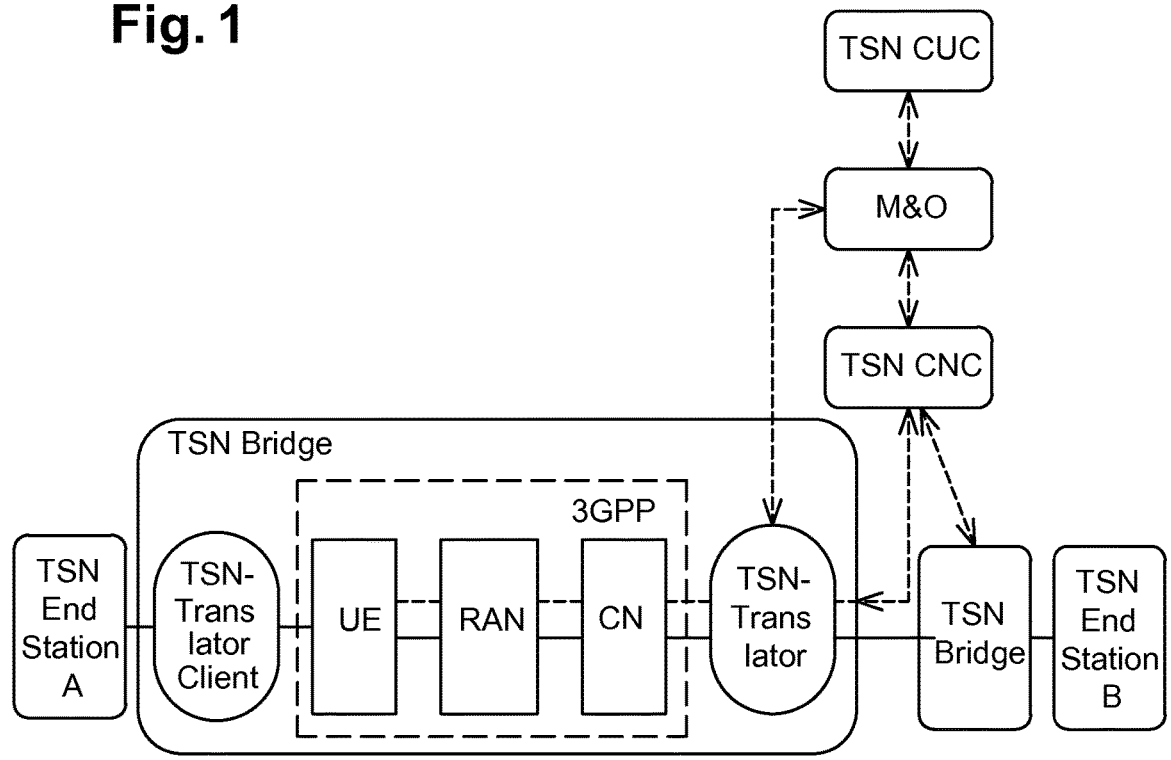
FIG. 2 shows a functional and simplified diagram of a TSN network using a wireless communication service based on 3GPP.

FIG. 2 shows the general concept of the TSN Translator and its TSN Translator Client and how the TSN End Station A is connected to the TSN network via a wireless connection service provided by the 3GPP network. FIG. 2 corresponds to FIG. 1, but one of the bridges is replaced by the 3GPP network embedded between the TSN translator and the TSN translator client. In addition, FIG. 2 shows a Management & Orchestration (M&O) entity of the 3GPP network, which is inserted between TSN CUC and TSN CNC. M&O may intercept messages between TSN CNC and TSN CUC. The role of M&O is explained later. In the context of the present invention, the presence of M&O between TSN CNC and TSN CUC and its role of intercepting messages is useful but not mandatory.

In FIG. 2 the entities of the TSN network are shown by round edged boxes and those of the 3GPP network are shown by sharp edged boxes. The UE, RAN and CN together constitute the 3GPP network which is enclosed within a dashed line box. The solid lines connecting the entities represent the data plane and the dotted lines the control plane. The TSN translator and TSN translator client shown by bold rounded boxes enable the transparent integration of the TSN network and the 3GPP network. The round edged box consisting of TSN translator, TSN translator client, and 3GPP network constitute the logical TSN bridge formed on top of the 3GPP network. Note: For simplicity, the communication paths of the TSN CUC with the TSN End Stations A and B are not shown in FIG. 2.

The TSN End Station A is connected to a UE via the TSN Translator Client. The UE is responsible to establish and handle the wireless connection service for the TSN End station A. The wireless connection service contains beside the wireless link between UE and Radio Access Network (RAN) also essential Core Network (CN) services to provide for example authentication, mobility, QoS, etc.

For the transparent usage of the wireless connection service and to hide specific behavior of the 3GPP network to the TSN network and vice versa, a TSN translator function is provided, which works as an intermediator between both domains, i.e. it understands the TSN protocol and maps the TSN CUC and TSN CNC messages as well as the TSN network messages into control and user plane messages of the 3GPP network to trigger corresponding actions in the 3GPP network, e.g. to trigger the establishment of a wireless connection with guaranteed QoS, and vice versa. Furthermore, it takes care of services like the enforcement of the priority classes for the traffic, frame translation, time gating etc which are typically offered by the bridges in the wired network to guarantee deterministic communication. With respect to this view, the TSN Translator and TSN Translator client are placed on both sides of the 3GPP network, the UE side and the CN side.

The TSN Translator and the TSN Translator Client are logically part of the same translation between 3GPP and TSN network and hence, it is beneficial that they do not act independently. Treating them as one entity allows to hide the TSN Translator at the UE side to the TSN network and to use the TSN Translator at the CN side to represent the complete 3GPP network as a TSN bridge to the TSN Network. This simplifies especially the configuration and handling at the TSN CNC and the respective TSN CUCs. The TSN translator performs the major part of the translation of the TSN protocols to 3GPP commands and procedures and vice versa. The TSN Translator client at the UE side acts on behalf of the TSN Translator at the CN side and is therefore called TSN Translator Client.

The integration of the TSN Translator with the TSN network is done by implementing the protocols for an TSN bridge, the TSN ethernet protocol to exchange messages between a TSN bridge with another TSN ethernet bridge or TSN End Station B (user plane traffic, also called data traffic) and the protocol to exchange information with the TSN CNC (control plane). Additionally, the respective communication of the TSN End Station A with the TSN CUC is also handled via the TSN Translator and its TSN Translator Client. In the 3GPP network, PDUs of the TSN network are transported as Service Data Units (SDU) of the 3GPP network.

Figure 3:
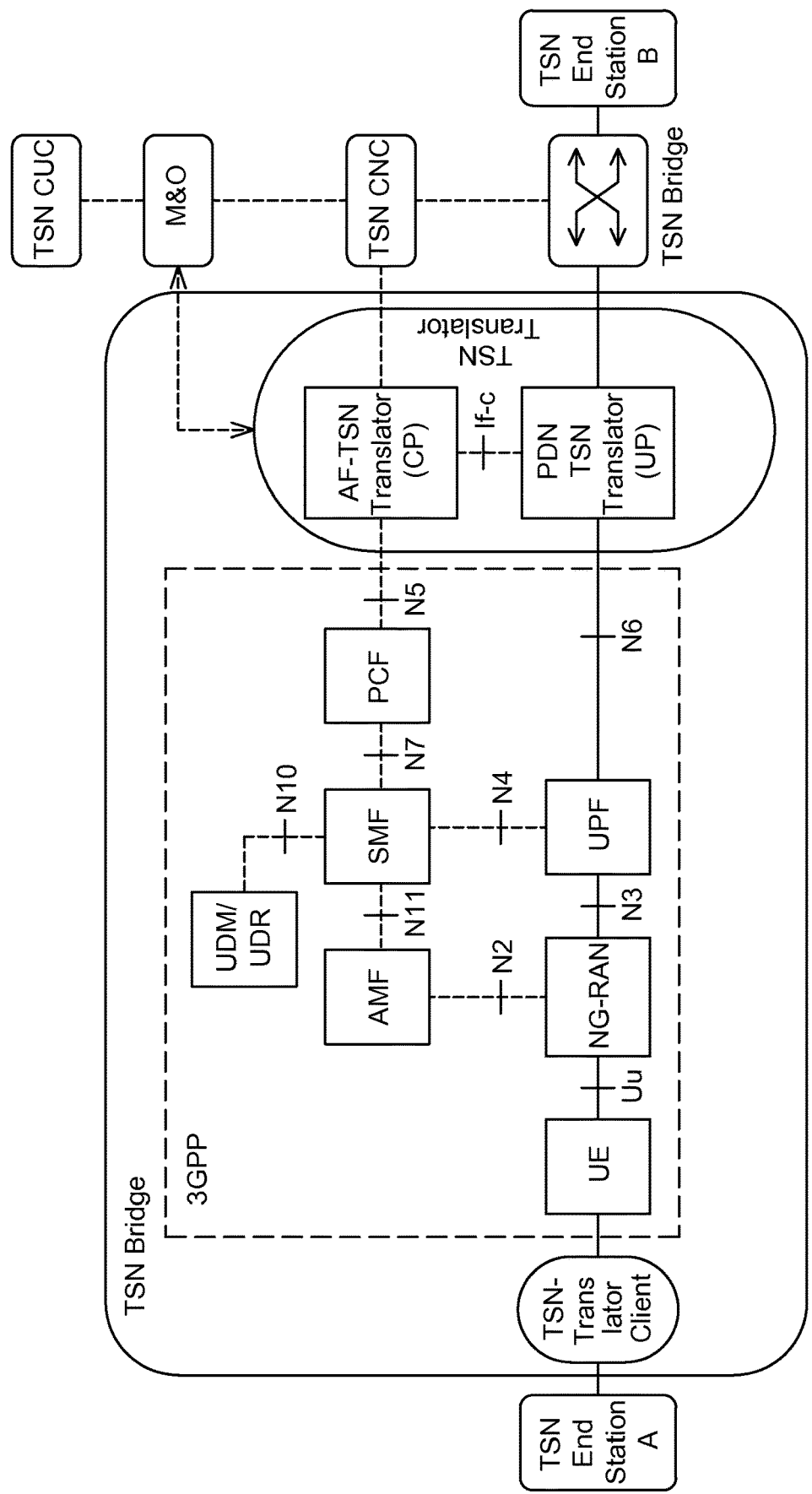
FIG. 3 shows an example implementation of a 3GPP network integrated into a TSN network.

FIG. 3 shows an example implementation for integrating TSN network with a 3GPP network. The entities in the 3GPP network, shown within the dashed box labelled 3GPP, are possible functional entities resulting from the 3GPP release 15 standardization. This example could be mapped to other 3GPP releases or non-3GPP wireless networks. Again, the role of the 3GPP M&O entity is explained later The TSN End Stations A and B could be a sensor, controller, actuator or any other industrial device. In this picture, UE is shown as a separate entity, however, it could be either integrated in the End Station A or can be plugged in to the TSN End Station. Similarly, the TSN Translator Client could also be an integrated part of TSN End Station A, UE, or both.

In FIG. 3, TSN Translator and its TSN Translator Client work as an intermediator between both domains, i.e., it understands the TSN protocol and the 3GPP protocols and maps the TSN commands and messages into corresponding actions and messages in a 3GPP network providing 5G and vice versa.

Two key types of information messages are differentiated by the TSN Translator:

1) The network configuration related messages of the TSN network we denote in the following by the term control plane (CP) (see also in FIG. 3) in order to be consistent with the naming convention of mobile network terminology. The CP messages, e.g. link layer discovery protocol messages are converted into the corresponding control plane messages and procedures in a 3GPP network. The control plane messages and procedures are used to establish for example a packet data unit (PDU) session or a service flow and to provide for example required QoS parameters for the service flow within the PDU session. The TSN translator has an interface to respective 3GPP functional entities of the core network (CN), e.g. in FIG. 3 the policy control function (PCF) of a 5G network, which interacts directly or indirectly with further 3GPP CN functional entities like Session Management Function (SMF) and Access & Mobility Management Function (AMF). The TSN Translator acts from the 3GPP network point of view as Application Function (AF) and uses the N5 interface. In addition, the TSN Translator derives information provided by its TSN Translator Client and the AF to act as a TSN Bridge in the TSN network. A typical example is the Link Layer Discovery protocol required at a TSN bridge to be interoperable with the TSN network.

Alternatively, other options, which are not shown in FIG. 3 may be used to interact between 3GPP CN and TSN Translator. The TSN Translator may provide an interface to the Network Exposure Function (NEF) when authentication and authorization features are needed, or a new functional entity in 3GPP domain could be created which provides the functionality of the TSN Translator in a standardized way. SBI (service based interfaces) may also be used to realize interfaces to the TSN Translator function.

2) For the transmission of data between the End Station A and End Station B, the TSN Translator has an interface to the User Plane Function (UPF) and the corresponding interface to the TSN Bridge that connects to the TSN End Station B, which we denote in the following by the term user plane (UP), again to align with the terminology applied in 3GPP networks. In FIG. 3, the UP of the TSN translator acts as a data network to the 3GPP network. On the other side, for the adjacent TSN Bridge and for CNC, it looks like a TSN bridge. With respect to the user plane functionality, the TSN translator shall offer e.g. one or more of the following functions:
   a. Removes the header information from the IP packets received at UPF and create the corresponding TSN packet
   b. Maps the packets received in a particular PDU session to the packets to be transmitted from the corresponding egress port
   c. Depending on the QoS flow of the given PDU session, place the packet in the corresponding priority queue of a specific port
   d. Based on the gate control list specified by the CNC, it shall transmit the packets from one of the different queues through the egress port. The gate control list specifies at which time interval a packet from a specified priority queue can be transmitted at a particular egress port.

Similar translation shall be performed when the TSN packets arrive at the TSN translator ingress ports. The priority queues shall be implemented at the translator or the translator client or both.

Similar to the TSN Translator, CP and UP translation is performed by the TSN Translator Client. The TSN Translator Client works on behalf of the TSN Translator so that the TSN Translator Client, 3GPP network and TSN Translator together appear to be a TSN bridge for the TSN network and the TSN End Station A.

The solutions described in PCT/EP2018/061892 are build upon the solution described in PCT/EP2018/054916. In terms of the apparatus, they provide an additional communication interface between the TSN Translator described in PCT/EP2018/054916 and the 3GPP Network Management and Orchestration (M&O) entity, as depicted in FIGS. 2 and 3. Such interface enables the exchange of information between M&O and TSN Translator for optimization of resource reservation and allocation in a 3GPP network. The M&O entity is logically placed between TSN CUC and TSN CNC, and can "intercept" the messages between TSN CUC and TSN CNC. Having the wider information about the TSN network, i.e. available devices, their capabilities, available resources and their utilization, actual stream requests etc., M&O complements the TSN Translator function of PCT/EP2018/054916 by providing information and instructions for implementation of more efficient resource allocation in the 3GPP network during TSN 'network discovery' and 'stream setup' procedures. The communication between M&O and TSN translator belongs to the management plane. The management plane refers mainly to functions and procedures to operate and monitor the network in the sense of fault, configuration, accounting, performance, security (FCAPS) management.

More specifically, M&O can interact with the TSN Translator to indicate the desired amount of resources to be reserved/guaranteed by 3GPP network during TSN network discovery phase, i.e., before the actual stream requests are issued. Hence, PCT/EP2018/061892 proposes two options for such interaction between M&O and TSN Translator, namely:
   a. M&O provides at least one (but potentially a set of) estimated QoS values for a 3GPP bridge (e.g. learned from previous setups or based on network planning, or based on end station type etc.) without necessarily requesting actual establishment of PDU sessions and reservation of resources; or
   b. M&O intercepts stream requests issued by the TSN CUC towards the TSN CNC, based on which it can derive the requirements for the 3GPP network, and then requests establishment of according PDU sessions.

In order to perform the translation between TSN and 3GPP network, the TSN translator may rely on information and instructions provided by M&O. The M&O entity has wider information about the 3GPP network in terms of devices, their requirements and capabilities, available resources and their utilization, traffic patterns, geo-locations of users and resources, etc. In the process of network discovery [6], CNC gathers the information about bridge and link delays. According to PCT/EP2018/054916, all PDU sessions that are possibly needed in future (at least one PDU session per UE) are established and the according QoS information is reported to CNC. In contrast, according to PCT/EP2018/061892, M&O offers at least one of the above mentioned three options for handling the process of network discovery, thus making it more efficient.

Following any of the two interaction options, M&O instructs the TSN Translator on number of PDU sessions to be established in the 3GPP network and/or 3GPP QoS values to be translated to TSN parameters (e.g. Bridge Delay) of 3GPP bridge.

After any change in the network that may affect already signaled parameters of 3GPP bridge, e.g. admission of additional UEs and new end stations, M&O may provide to TSN Translator corresponding updates. E.g., either it updates the estimated QoS values for 3GPP bridge or requests the PDU session setup with updated QoS values.

The TSN Translator (and its TSN Translator Client) may provide the following functions:
   1. The TSN Translator and its TSN Translator Client are enabled to initiate PDU sessions and QoS flows with a set of pre-defined QoS parameter, e.g. 5G QoS indicator (5QI), in the 3GPP network, which are used to exchange information between TSN Translator Client and TSN Translator. The PDU sessions and respective QoS flows are used to transport information between:
      [1] TSN End Station A and TSN CUC (e.g. authentication and authorization)
      [2] TSN Translator and its TSN Translator Client (e.g. link layer discovery protocol)
      [3] TSN End Station A and TSN End Station B (e.g. measurement data from a sensor to a controller)
   2. The UE connected to the TSN Translator Client establishes the wireless connection to the 3GPP Core Network domain, based on standardized 3GPP authentication and authorization procedures. The TSN Translator Client, which is connected to the UE may provide additional credentials allowing to check if the UE and TSN Translator Client together are authorized to establish a wireless connection. Optionally, the TSN Translator Client provides further credentials of the connected TSN End Station A that is added to the credentials.

3. The 3GPP network allows to establish additional PDU sessions and QoS flows for existing and/or the new PDU sessions with a set of pre-defined QoS parameter (e.g. 5QI), which is controlled by a Policy Control Function PCF (in some embodiments upon instruction by the M&O entity). M&O entity derives such instructions based on the information about e.g. available end stations, their mapping to UEs, topological constraints, communication requirements of end stations (e.g. on required minimum or average throughput), traffic pattern (e.g. cyclic data), maximum or average allowed packet loss, maximum or average latency, and/or jitter. A typical PDU session may define a maximum delay (e.g. 10 ms) and further information, which needs to be guaranteed with high probability (e.g. 99.999%) and minimum guaranteed bit rate (e.g. at least 1 Mbps).

4. The TSN Translator and its TSN Translator Client supports the Link Layer Discovery Protocol (LLDP) and participates in the network discovery procedure executed by the TSN CNC. The PDU session and the QoS flow represent the connection between the UE and the UPF. This information is mapped to TSN Bridge managed objects' parameters, which are then reported by the TSN Translator to the TSN CNC. Also in the case that no PDU session is established, i.e. M&O entity only provided estimated QoS values for 3GPP network, such values are also mapped to TSN Bridge managed object's parameters.

5. The TSN Translator and its TSN Translator Client has at least one of the following functions:
   [1] Mapping of control plane information from the TSN network and the TSN End Stations to 3GPP control plane information
   [2] Mapping of control plane information from the TSN network and the TSN End Stations to information exchanged between TSN Translator and it's TSN Translator Client
   [3] Mapping of control plane information from the 3GPP network to information exchanged between TSN Translator and TSN Translator Client, and TSN network and the TSN End Stations
   [4] Handling of TSN user plane, including the time gating at the egress port and the ingress port
   [5] Handling of Time Synchronization in the TSN network
   [6] Access control for TSN end station
   [7] Mapping of information provided by M&O entity to the 3GPP control plane information (in particular mapping of TSN QoS values to required PDU sessions and according QoS flows)
   [8] From [i], derivation of Bridge Delay object for 3GPP bridge
   [9] Mapping of PDU sessions from [7] to TSN port information (e.g. MAC address of the bridge's sending port, c.f. [6])
   [10] TSN Translator provides information from [9] to TSN Translator Client 6. The 3GPP network may provide multiple PDU sessions for the UE connected to the TSN Translator Client to realize at least one wireless connection in the 3GPP network. Each PDU session may contain multiple QoS flows with a defined set of QoS parameters for each.

The TSN Translator and its TSN Translator Client maps each QoS session and its QoS parameters to TSN Bridge managed object's parameters and reports them to the TSN CNC to allow more flexible options for the computed schedule.

In the following, an example way of interaction is described, i.e. how the TSN Translator and its TSN Translator Client interact with the 3GPP network and its entities (in particularly, M&O) when providing a wireless communication service to a TSN network and its TSN entities. For simplification and a better understanding, it is assumed that the TSN CP traffic is handled in a default 3GPP PDU session with respective QoS flow(s) and further PDU sessions with respective QoS flows handle the TSN UP traffic.

Initial Setup of 3GPP-TSN Network

The procedure of initial setup of 3GPP-TSN network for the purpose of TSN end station authentication follows the steps described in PCT/EP2018/054916. In addition, according to PCT/EP2018/061892:

1) All available information about devices (UEs and TSN end stations) (or a reasonable subset thereof, such as TSN end station ID, UE IMSI, UE category, allowed PDU session types and the default PDU session type, default 5QI values, SSC (session and service continuity) mode, static IP address/prefix, geolocation, applications hosted/used by the station, traffic profile (such as probability distribution of traffic volume), mobility profile, etc.) is provided to M&O entity already during the network planning phase and collected in a database. I.e., this information is provided to M&O during the step in which an engineer prepares TSN network (e.g. inserting end station ID into CUC) and 3GPP network (e.g. specifying IMSI, 5QI for default PDU session to UDM).

2) After a successful authentication of TSN end station by the CUC the acknowledge message is sent back from CUC to the end station. The M&O intercepts the information about newly authenticated TSN end station. This may serve as a trigger for updating the QoS values of 3GPP bridge provided by M&O entity.

Network Discovery Procedure

The LLDP protocol is executed by the TSN Bridges and the TSN End Stations A and B through which they learn about their direct neighbours. The LLDP protocol is executed in a regular interval so that the actual information about the neighbouring end stations and bridges is available and (mostly) up to date. The TSN Translator on the TSN network side and the TSN Translator Client on the TSN End Station A side also support the LLDP protocol and exchange the LLDP parameters (e.g., source and destination MAC address) with their neighbours in the TSN network. Additionally, TSN Translator provides to TSN Translator Client TSN port information, including the mapping of ports to PDU sessions and QoS flows.

Figure 9:
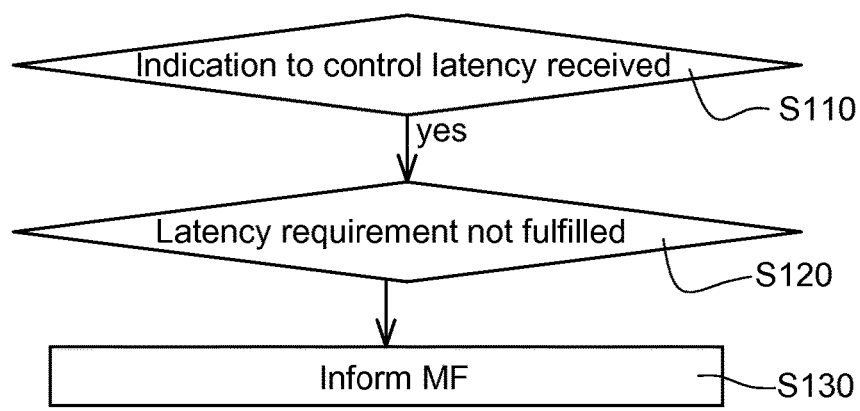
FIG. 9 shows a method according to an embodiment of the invention.

Typically, the CNC becomes aware of network topology by reading LLDP parameters and Bridge Delay objects from the TSN bridges. This information is not known to CUC, unless it is explicitly requested by CUC. The FIG. 9 shows this general case of TSN network discovery.

TSN bridges and end devices perform the LLDP procedures learning the connection information of their network peers. Such information in stored in managed objects on bridges and it is read by the CNC. During the discovery process, the TSN CNC will crawl through all the TSN bridges to collect information about the links they are connected to, their capacity, link propagation delay, bridge delay and the devices attached to the ports available to them, from the bridge managed objects. As a result, the CNC builds a view on physical topology of the network along with performance metrics and capabilities of the bridges and links. Since 3GPP network appears as a virtual TSN bridge to the TSN CNC, the TSN Translator and its TSN Translator Client manages corresponding bridge objects so that the TSN CNC can read this information. The ingress ports of the virtual TSN Bridge offered to the TSN End Station A are handled by the TSN Translator Client and the corresponding egress ports are handled by the TSN Translator. At least one PDU session in 3GPP network represents the connection between one ingress port and one egress port of the virtual TSN Bridge. The QoS flows with the different QoS parameters is analogous to the QoS handling of the TSN network. During the network discovery procedure, the QoS values that represent the capabilities of 3GPP network are provided by M&O entity. Such QoS values are translated by the TSN Translator to Bridge Delay managed object. There are multiple options for M&O to establish and provide needed QoS parameters. In the following, an overview description of options for M&O involvement according to PCT/EP2018/061892 is provided.

According to some options of PCT/EP2018/061892, M&O provides a set of estimated/pre-determined values of QoS values to TSN Translator. Such estimated values can be derived for example from previous stream settings, or from network planning information (e.g., collected in a database and processed using machine learning algorithms), or from a grouping of TSN end stations.

According to one option in PCT/EP2018/061892, M&O intercepts stream requests issued by a CUC. Reading the requirements of the stream to be set up, it can derive the required PDU session(s) and QoS flows of the 3GPP system. An according session establishment request is sent to the TSN Translator, which in turn issues an PDU session establishment request to the 3GPP network. After receiving the acknowledgment that the PDU session(s) has (have) been established, the TSN translator maps the PDU session's 5QI values to the according Bridge Delay object parameters. M&O, upon receiving the ACK for successful PDU session establishment, forwards the stream requests to the TSN CNC which computes the schedule and paths for the requested stream(s). CNC returns this to CUC, but it is first intercepted by M&O in order to check for necessary updates of the PDU sessions established before. E.g. in case of failure to compute feasible schedule, the M&O can request such updates using the same procedure as for PDU session establishment, including update of Bridge Delay parameters. Afterwards, M&O triggers the re-computation of feasible schedule by re-submitting the original stream request to the CNC. Once the schedule has successfully been computed it is forwarded to the original recipient, the TSN CUC.

Under assumption that the frequency with which the CNC performs the network discovery is high, the CNC always has "up to date" information about the network, hence no explicit trigger for network discovery is needed after the establishment of the new PDU sessions. Alternatively, the M&O can trigger CNC to perform such explicit network discovery every time the M&O received an acknowledgement for newly established PDU sessions.

Establishment of End to End Communication

For establishment of a communication between one (or multiple) talkers and one (or multiple) listeners, the TSN CUC reads the QoS parameters and stream requirements from the TSN End Stations A and B. In the usual TSN procedure, this information and the information about the TSN End Stations A and B (e.g. MAC addresses) to be connected are then provided to the TSN CNC. According to PCT/EP2018/061892, the M&O entity may intercept the Stream Request message in order to check whether existing (i.e., already established) PDU sessions can fulfil the requirements or if new/modified PDU session need to be set up. In the latter case the M&O instructs the TSN Translator to trigger the 3GPP network to set up PDU session(s), QoS flow(s), and/or update QoS flow parameters respectively. Only afterwards, the stream request is forwarded to TSN CNC.

Some embodiments of the invention tackle at least one of the following issues of [6] and [8]:
Issue #1: how to expose 3GPP bridge information to the TSN framework (i.e., CNC), and
Issue #2: how to enforce TSN latency QoS requirements within a 3GPP network.

Both issues are related and not mutually exclusive.

For issue #1, in order to appear as an "ordinary" TSN bridge towards the TSN entities, e.g. CNC or TSN end devices, the 3GPP bridge needs to expose the same set of parameters as an "ordinary" TSN bridge. The CNC uses a set of managed objects in order to acquire the information about the bridges, build the knowledge about the network capabilities as well as to configure each bridge. Such managed objects are e.g., Bridge Delay, Propagation Delay, Static Trees and MRP Extended Control [2]. The Bridge Delay is of particular importance for functionality of the integrated TSN-3GPP network. The attributes of a Bridge Delay managed object determine the delay of frames which pass through the TSN bridge. In order to acquire correct information about the capabilities of a 3GPP bridge in terms of the delay and to correctly establish the E2E communication across TSN and 3GPP networks, it is of fundamental importance to correctly derive the delay attributes of a 3GPP bridge and to expose them in expected form to TSN for computation of schedules and paths. In centralized architectures for example, the TSN CNC expects that the bridge delay is expressed through the values that are dependent and independent of the frame length, whereas in 3GPP network such representation is not applied. Therefore, an explicit mapping of the delay attributes of a 3GPP network to the delay attributes of a TSN bridge is not possible. In other words, the delay attributes available in a 3GPP network cannot be exposed as delay attributes of a '3GPP bridge'. To the best of our knowledge, there is no method for deriving the Bridge Delay parameters of a 3GPP Bridge and exposing such parameters in the form expected by the TSN.

For issue #2, in an integrated TSN-3GPP network, the QoS requirements for TSN traffic need to be clearly identified in order to enable the according treatment in the 3GPP network. For instance, the TSN traffic needs to be handled appropriately by a UPF, and in order to be directed to a UPF dedicated to such handling of TSN traffic, the TSN traffic needs to be recognized by the SMF. To the best of our knowledge such identification is not yet available in the 3GPP network.

According to TSN standards, the delay of a TSN bridge is represented by Bridge Delay managed object with four attributes:
  a. independentDelayMin,
  b. independentDelayMax,
  c. dependentDelayMin,
  d. dependentDelayMax These values represent the delay (independent and dependent on the frame length) that frames experience while passing through the bridge. There is one Bridge Delay managed object per (ingress, egress) port pair and traffic class.

The independentDelayMin/Max represents the frame length independent delay for forwarding the frame between ingress and egress port and a given traffic class. On the other hand, the dependentDelayMin/Max depends on the number of octets of a frame to be transmitted. This delay includes the time to receive and store the frame which is related to the link speed of the ingress port. Such notion of delay is not natively supported by the 3GPP network where for 5G networks the delay that a packet experiences is expressed by the packet delay budget PDB attribute defined for each QoS flow of a PDU session and its associated 5QI value [4]. By definition in [4], the Packet Delay Budget (PDB) represents an upper bound of the latency that a packet experiences while being transmitted between UE and the UPF. For each delay critical guaranteed bit rate (GBR) traffic QoS flow, the attribute of Maximum Data Burst Volume (MDBV) is defined and it denotes the largest amount of data that the 5G-AN (access network) is required to serve during the 5G-AN part of the PDB. It should be noted that MBDV is not directly mapped to packet or PDU size, meaning that a data burst can consist of several packets transmitted back-to-back (consecutively). However, for TSN it is expected that one Ethernet frame is transmitted per data burst. For each delay critical GBR traffic class and its corresponding 5QI value the PDB and Default Maximum Data Burst Volume are defined.

For 4G networks, a study on latency [9] assesses important components of uplink and downlink transmission latency in LTE giving the numeric values of each of the components. However, it is not known a differentiation between packet/frame length dependent and independent delays that can be easily mapped to the Bridge Delay attributes in TSN networks.

To the best of our knowledge, it is yet open how to map the latency values of 3GPP network to the Bridge Delay attributes expected by the TSN CNC, as well as how to identify the TSN traffic in 3GPP network.

Some embodiments of the invention provide a solution for at least one of the following issues:
(1) Mapping the QoS description and requirements of a 3GPP network delays to the TSN Bridge Delay managed object in order to support seamless integration of TSN and 3GPP networks, and
(2) Enforcing the TSN QoS requirements in the 3GPP network.

The assumed architecture is based on the 3GPP network acting as a TSN bridge (in the following referred to as "3GPP bridge") towards the TSN [6]. However, the 3GPP network is not necessarily a monolithic functional entity, but rather it consists of different, potentially dis-located functions such as RAN (base stations and mobile terminals) and core network (CN), including one or more routing and gateway functions denoted as user plane function (UPF) in the 5G system.

Figure 4:
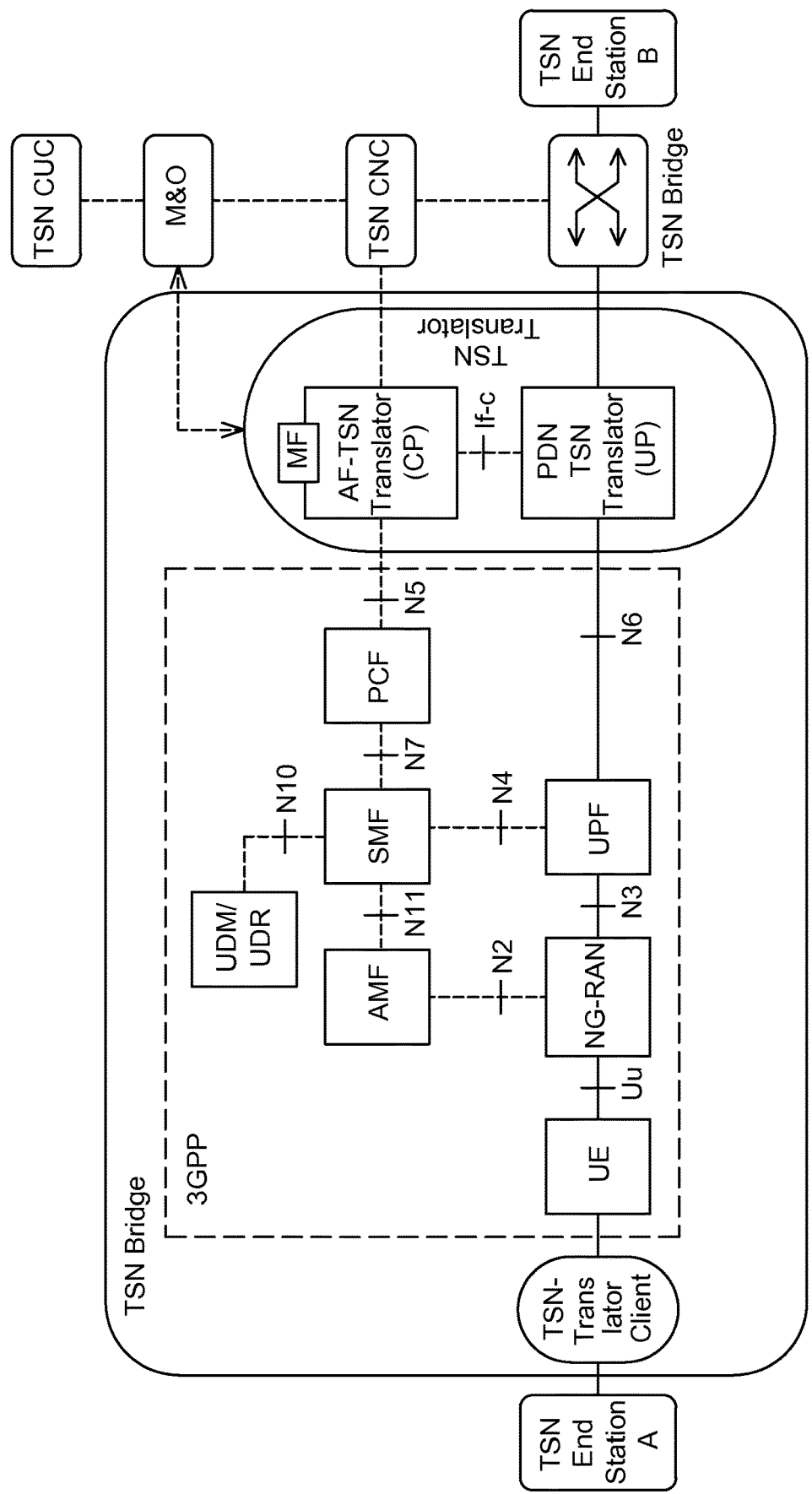
FIG. 4 shows an example implementation of a 3GPP network integrated into a TSN network according to some embodiments of the invention.

At least one of the following system and methods may be provided:
A mapping function (MF) which maps E2E QoS parameters in the 3GPP network to TSN-specific management attributes. This function can be located in different logical entities, including the TSN translator [1] as illustrated in FIG. 4, or in an M&O entity [8]. FIG. 4 corresponds to FIG. 3, wherein the mapping function (MF) is additionally shown.

Each node in the 3GPP system implements a local QoS mapping and enforcement function which ensures that a PDU (corresponding to an Ethernet frame) which traverses in downlink or uplink direction does not violate the E2E QoS requirements as exposed to the TSN.

Solution Component #1. Mapping Between '3GPP Bridge' Delay and the TSN Bridge Delay.

According to some embodiments of the invention, MF maps the packet delay budget values of an established PDU session to the bridge delay attributes of a 3GPP bridge taking into account the following:
One QoS flow carrying TSN traffic is mapped to a (ingress, egress) port of a 3GPP bridge;
One UE maintains multiple QoS flows of which typically at least one serves the best effort traffic;
Each established PDU session may have more than one QoS flow with associated 5QIs (QoS classes).

According to the definition of the TSN Bridge Delay managed object, it has three indices: ingress port, egress port and traffic (QoS) class. Similarly, the QoS flows are determined by three indices: source and destination address, and 5QI class. However, not every QoS flow in an established PDU session is carrying TSN traffic. Therefore, the MF needs to expose the Bridge Delay attributes of the 3GPP bridge only for a set of QoS flows relevant for the TSN traffic transmission. The following is assumed:
There is only one TSN Ethernet frame transmitted per TSN time cycle and traffic class;
A TSN Ethernet frame is transported in a single PDU (packet data unit) in the 3GPP bridge;
Consequently, there is only one PDU per data burst to be considered, i.e. the MDBV corresponds to the maximum PDU size. MDBV and maximum packet size/PDU size can be used as synonyms.

For such QoS flows, the MF performs the derivation of TSN Bridge Delay managed object attributes for a 3GPP Bridge based on the QoS flow packet delay budget (PDB) (packet corresponds to a frame/PDU) values and the MDBV indicated in the QoS profile. Following the notion of TSN Bridge Delay, the delay τ of a 3GPP Bridge, corresponding to the E2E PDB within a 3GPP system, consists of two parts: packet size dependent and packet size independent, which can be expressed by the following linear equation:

$$\tau(P) = \frac{1}{\alpha}P + \beta,$$

where α represents the 3GPP guaranteed bit rate for a data flow which should be constant for each data burst, P the packet/frame size, $$\frac{1}{\alpha}P$$

is the dependent delay part) and β the independent delay part of the end-to-end 3GPP Bridge delay. Note that the independent delay part reflects internal components of the 3GPP bridge such as jitter buffer, packet processing times, etc.

The PDB value, being defined as an upper bound of packet delay represents the $$\tau_{max} = \frac{1}{\alpha}P_{max} + \beta,$$

i.e., PDB=$\tau_{max}$. For each time-critical GBR flow, the QoS profile incorporates the information about guaranteed UL/DL flow bit rate (GFBR), as well as maximum allowed UL/DL flow bit rate (MFBR). The GFBR and MFBR can be used as lower and upper bound value of α. Given the delay formula above, and the maximum packet/frame size range $P_{max}$, as well as the flow bit rate values, the packet size dependent part of the delay (min and max values) can be determined. Furthermore, having the packet size dependent part of the delay, the packet size independent delay β can be derived for a given QoS flow. The TSN translator exposes these Bridge delay attributes (dependentDelay and independentDelay) towards the TSN CNC.

In TSN networks, TSN frames are transmitted in time cycles where a part of such cycle (with specific length) is assigned to a specific traffic class. In such a way, according to the traffic class priority, the traffic receives an exclusive right for a defined time to use the transmission medium. Thus, a TDMA (time division multiple access) approach with high granularity is used in TSN networks in order to separate in time domain the time-critical communication from best-effort traffic.

In contrast to TSN networks, 3GPP LTE and 5G apply OFDM (orthogonal frequency division multiplex) where data is encoded in frequency domain and therefore, the mapping of delay parameters between TSN and 3GPP networks is not straightforward.

The delay that frames experience while being forwarded through the TSN Bridge is expressed by the Bridge Delay managed object. The Bridge Delay managed object contains four attributes that refer to frame length dependent (minimum and maximum) and independent (minimum and maximum) delay. In following, we describe exemplary implementations of some embodiments of the invention.

As described in [6] and hereinabove, the TSN Translator requests the establishment of PDU sessions and QoS flows with specific QoS requirements, i.e. 5QI values in order to enable E2E communication across TSN and 3GPP networks. The information on the number and characteristics of the PDU sessions and QoS flows (e.g. 5QI values) to be set up can be indicated by the M&O entity as described in [8]. Furthermore, the M&O, knowing the characteristics of the PDU sessions and QoS flows that will be needed for integration with TSN, can derive the maximum expected packet/frame size for each QoS flow. This information is then signalled towards the mapping function MF, as an input for estimation of 3GPP Bridge delay attributes, i.e. 'independentDelay' and 'dependentDelay' values that will be exposed towards the TSN.

In order to estimate the required delay values of QoS flows, the MF may use the information available in QoS profiles/PCC rules acquired from the SMF/PCF. For each 5QI value, there is either standardized upper bound value for packet delay (PDB—Packet Delay Budget, whereas packet is used as synonym for PDU), or such values are dynamically signalled over NG2 interface [4]. The MF uses such defined packet delay values for deriving the dependentDelayMin/Max values of the '3GPP Bridge'. The PDB associated to each 5QI value represents the maximum delay of the packet between UE and UPF, thus it can be expressed by formula for maximum delay $$\tau_{max} = \frac{1}{\alpha}P_{max} + \beta$$

(e.g. with an assumption $\beta_{min}=\beta_{max}=\beta$. Furthermore, for each time critical GBR flow, the QoS profile incorporates the information about guaranteed UL/DL flow bit rate (GFBR), as well as maximum allowed UL/DL flow bit rate (MFBR). The MF can use the values of GFBR and MFBR as lower and upper bound value of throughout in 3GPP network, i.e. $\alpha_{min}$ and $\alpha_{max}$, respectively. In order to estimate the dependentDelay(Min/Max) values, the MF utilizes the delay formula above, as well as the following input parameters:

the information on the packet/frame size value which is the maximum expected packet size (i.e. maximum Protocol Data Unit Volume, $PDUV_{max}$). For example, $P_{max}$=MDBV for a given QoS flow may be indicated by 3GPP M&O entity. In some embodiments (for example, if $P_{max}$ is not indicated by 3GPP M&O, or if 3GPP M&O is not available), the largest possible value may be taken for $P_{max}$. This value depends on the considered network technology. In the case of TSN (IEEE 802.1 Ethernet), the so-called MTU (maximum transmission unit) is 1500 bytes for the standard frame, where 42 bytes for the frame header, interframe spacing, etc have to be added, so $PDUV_{max}$=1542 bytes.

MFBR (Maximum Flow Bit Rate)

GFBR (Guaranteed Flow Bit Rate)

Furthermore, knowing the packet-size dependent part of the delay, the packet-length independent delay β can be derived for a given QoS flow based on the linear delay expression.

The result of calculation is as follows:

Packet length independent delay β:

Max:

$$\beta_{max} = PDB_{max} - \frac{P_{max}}{\alpha_{min}},$$

where $\alpha_{min}$=GFBR and (e.g.) $PDB_{max} \geq 10$ ms

Min:

$$\beta_{min} = PDB_{min} - \frac{P_{max}}{\alpha_{max}},$$

where $\alpha_{min}$=MFBR and $PDB_{min}$=5 ms

For typical values of packet delay budget (PDB), cf. 3GPP TS 23.501, Table 5.7.4-1. If only one PDB value (instead of $PDB_{min}$ and $PDB_{max}$) is given: $\beta_{min}=\beta_{max}=\beta$.

Packet length dependent delay:

Max:

$$\frac{1}{\alpha_{min}}P_{max},$$

where $\alpha_{min}$=GFBR

Min:

$$\frac{1}{\alpha_{max}}P_{max},$$

where $\alpha_{min}$=MFBR

As an alternative, the packet length independent delay β may be determined by measurements:

$\beta_{min}$ can be reported as e.g., 5th percentile of frequency distribution of latency (based on measurements)

$\beta_{max}$ can be reported as e.g., 99th percentile of frequency distribution of latency (based on measurements)

According to the TSN Bridge Delay definitions, the independent and dependent delays represent the worst-case range per design/configuration of the Bridge. However, in order to obtain the accurate delays of the bridge which include the delay due to bridge operation (e.g. delay due to the traffic scheduling, traffic shaping, frame pre-emption, jitter buffer etc.) the TSN CNC needs to perform the measurement by reading the delays of ports that ingress/egress the streams.

In the case of a '3GPP Bridge', such measurements will be performed with the help of TSN Translator and TSN Translator Client, which are placed at the ingress/egress ports of the '3GPP Bridge'. The CNC will read the frame delays of ports as exposed by the TSN Translator and the TSN Translator Client.

Figure 5:
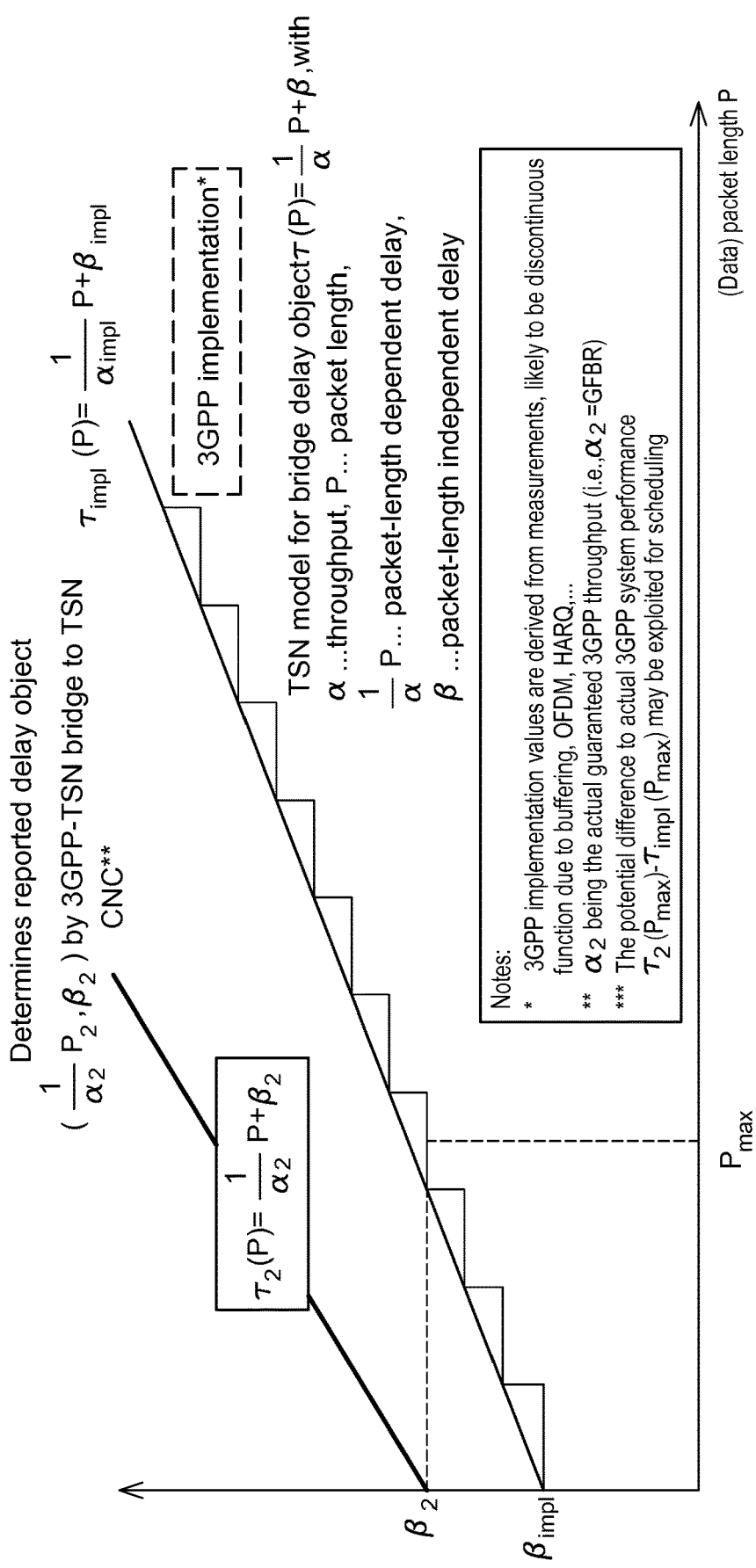
FIG. 5 shows an explanatory diagram for the mapping of 3GPP QoS parameters to TSN delay parameters according to some embodiments of the invention.

FIG. 5 shows an exemplary relationship of TSN bridge delay object, 3GPP TSN-Bridge implementation, and reported delay values. First, the dashed line shows the expected delay of an exemplary (but arbitrary) 3GPP implementation of a TSN bridge as referred to in [6]. Apparently, this function would rather be discontinuous. The discontinuity is caused by buffer times, PDU packing/unpacking, OFDM framing, Hybrid ARQ, and other effects. The curve $\tau_{impl}(P)$ reflects the minimum possible linear function representing the delay caused by the 3GPP-TSN bridge where $1/\alpha$ relates to the dependent delay and reflects the bridge's port capacity and $\beta$ relates to the independent delay, which reflects static processing time of the bridge.

For a maximum packet size $P_{max}$, a minimum delay $\beta_2$ can be given. In 3GPP, requirements on latencies (e.g. in QoS profiles) are formulated as absolute values and not as functions of the packet size. Therefore, a fixed value needs to be applied by the 3GPP-TSN bridge to the end-to-end connection between 3GPP UE and TSN Translator. The minimum delay value that can be guaranteed by the 3GPP bridge for a given maximum packet size $P_{max}$ corresponds to the expected delay for this packet size (on the dashed line in FIG. 5). A lower value must not be reported because even for smaller packets than the maximum burst data size it may happen that the full PDB is exploited by the 3GPP system and then, the delay expected by the TSN CNC could not be guaranteed. Towards the TSN system, the following parameters may be signalled:

Independent minimum delay $\beta_{impl}$
Dependent minimum delay $1/\alpha_{impl}$
Independent maximum delay $\beta_2$ (depends on the assumed maximum burst data size)
Dependent maximum delay $1/\alpha_2$ Solution Component #2: Enforcement of Exposed 3GPP Bridge Delay Attributes by Including TSN-Specific Attributes in the 3GPP E2E QoS Profile The 3GPP network needs to guarantee the values of the Bridge Delay attributes (independentDelayMin/Max and dependentDelayMin/Max) that are estimated by the MF and exposed by the TSN Translator towards TSN.

This requires additional entries in the standardized format of the QoS profile described in [4]. The QoS profile of a QoS Flow contains mandatory QoS parameters such as 5G QoS Identifier (5QI) and Allocation and Retention Priority (ARP) and optional QoS parameters such as Reflective QoS Attribute (RQA). The TSN-specific parameters shall be included as optional QoS parameters, which indicate that the QoS flow carries TSN traffic along with the information about the maximum expected packet size and packet length dependent and independent delay attributes, given the maximum expected packet size.

Furthermore, in order to react to the potential changes in the network that can affect the fulfilment of reported bridge delay values, the QoS profile may include the entry for activation of the notification regarding such events. Hence, if network conditions change, e.g. due to increasing load, time-varying radio conditions, or other effects which cannot be mitigated by the QoS enforcement functions, the MF may be informed by 3GPP nodes optionally including an indication of the cause, the latency excess, and an estimation of the new upper latency bound.

The disclosed extension of the standard QoS profile format is as follows.

For each QoS Flow, the QoS profile may include at least one of the following QoS parameters:
Time Sensitive Network Attribute (TSNA)—indicating that this specific QoS flow is carrying TSN traffic, giving the possibility of special treatment of TSN flows within the 3GPP network
Maximum expected TSN packet/frame size
Expected independentDelayMin/Max—indicating the latency induced by components such as processing time, etc., given the maximum expected packet size.
Expected dependentDelayMin/Max—indicating the expected latency dependent on e.g. radio transmission, scheduling, retransmissions, queueing, given the maximum expected packet size.
Latency notification control—The Latency notification control indicates whether notifications are requested from the 3GPP network when the expected maximum latency for a given maximum packet size can no longer (or again) be fulfilled for a QoS Flow during the lifetime of the QoS Flow.

In order to enforce and maintain the 3GPP Bridge delay attributes estimated by MF and signalled towards the TSN, the new entries need to be introduced in the QoS profile of QoS flows that will carry TSN traffic.

The proposed addition to the currently standardized QoS profile format is marked bold below.

For each QoS Flow, the QoS profile shall include QoS parameters:
A 5G QoS Identifier (5QI); and.
An Allocation and Retention Priority (ARP).
For each Non-GBR QoS Flow, the QoS profile may also include the QoS parameter:
Reflective QoS Attribute (RQA).
For each GBR QoS Flow, the QoS profile shall also include the QoS parameters:
Guaranteed Flow Bit Rate (GFBR)—UL and DL; and
Maximum Flow Bit Rate (MFBR)—UL and DL; and
In the case of a GBR QoS Flow only, the QoS parameters may also include:
Notification control.
Maximum Packet Loss Rate—UL and DL.
For each QoS Flow, the QoS profile may also include one or more of the following QoS parameters:
Time Sensitive Network Attribute (TSNA)
Maximum expected packet/frame size or MDBV
independentDelay—Min and Max
dependentDelay—Min and Max
Latency notification control The TSN Attribute (TSNA) is an optional parameter which indicates that traffic (not necessarily all traffic) carried on this QoS Flow is TSN traffic. This parameter enables (if needed) special treatment of TSN traffic while being transmitted over 3GPP network.

Maximum expected packet size is the parameter that can be used by network functions in the 3GPP network to estimate the probability of the fulfilment of the delay requirements (independentDelay and dependentDelay) for a "worst case" of maximum packet size and given network conditions, e.g. given load or current radio conditions. Based on such probability the network functions can send latency notifications towards the SMF indicating that the required latency requirements cannot be fulfilled. The SMF, based on the policies can perform the according actions, e.g. modify or remove the QoS Flow.

Optional: TSN traffic identification. The SMF is responsible for assigning the QFI (QoS Flow ID) to the QoS Flow, and derivation of QoS profile for a QoS Flow, as well as corresponding UPF instructions and QoS Rule(s) based on the PCF rules. As described in [6], the TSN Translator acts as AF from 3GPP point of view. As described in [4], an AF may send requests towards the 3GPP network that influence the 3GPP network operation. The AF requests are sent to the PCF via N5 or via the NEF (network exposure function). The requests from AF need to contain the traffic identification, e.g. in the form of AF-Service-Identifier. The PCF translates the received AF requests into policies that apply to PDU sessions.

In order to identify the TSN traffic within 3GPP network such that corresponding QoS profile can be derived by SMF the TSN Translator may use dedicated AF-Service-Identifier for TSN traffic and to signal it to the PCF. For example, not only TSN traffic may use a particular (e.g. newly defined) QoS profile (new 5QI) for TSN traffic, but also traffic from other networks (or applications) with similar QoS requirements. TSN traffic identification can be used to separate TSN from such traffic. Furthermore, TSN has further requirements regarding time synchronization (relevant for, e.g., UPF and UE configuration) and deterministic packet/frame delivery that are not reflected in the QoS profile. These requirements may be fulfilled if the respective flow is identified as a TSN flow.

Figure 6:
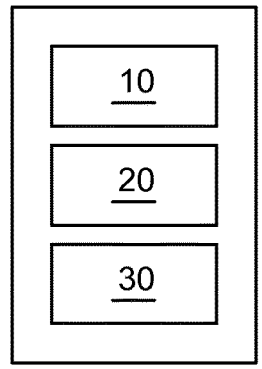
FIG. 6 shows an apparatus according to an embodiment of the invention.
Figure 7:
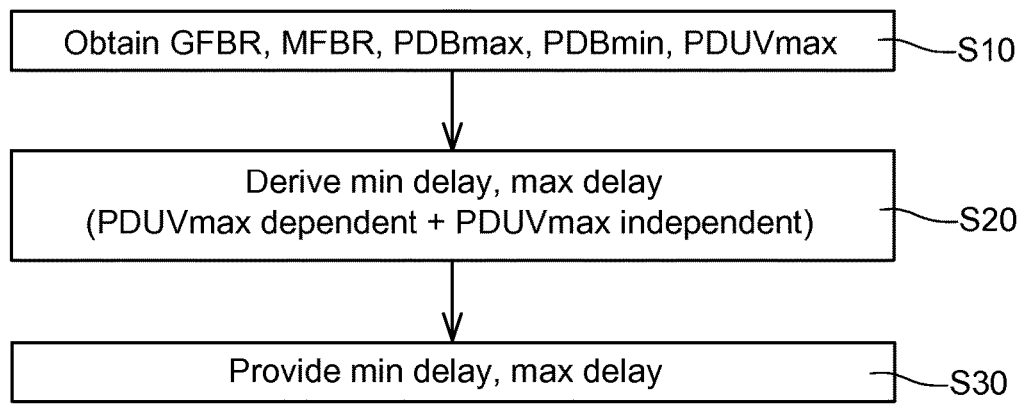
FIG. 7 shows a method according to an embodiment of the invention.

FIG. 6 shows an apparatus according to an embodiment of the invention. The apparatus may be a mapping function MF or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for obtaining 10, means for deriving 20, and means for providing 30. The means for obtaining 10, means for deriving 20, and means for providing 30 may be an obtaining means, deriving means, and providing means, respectively. The means for obtaining 10, means for deriving 20, and means for providing 30 may be an obtainer, deriver, and provider respectively. The means for obtaining 10, means for deriving 20, and means for providing 30 may be an obtaining processor, deriving processor, and providing processor, respectively.

The means for obtaining 10 obtains the following parameters related to a flow from a first network through a second network (S10):
  a maximum protocol data unit volume $PDUV_{max}$ of the flow in the first network;
  a maximum flow bit rate MFBR of the flow in the second network;
  a guaranteed flow bit rate GFBR of the flow in the second network; and
  a maximum protocol data unit delay budget $PDB_{max}$ of the flow in the second network;
  a minimum protocol data unit delay budget $PDB_{min}$ of the flow in the second network.

The first network may be a fixed network such as a TSN network. In particular, it may be a time deterministic network. The second network may be a wireless network such as a 3GPP network.

The means for deriving 20 derives from the obtained parameters at least one of (S20):
  a maximum delay $\tau_{max}$ a packet of the flow experiences in the second network, wherein the maximum delay is a sum of a maximum $PDUV_{max}$ dependent contribution and a maximum $PDUV_{max}$ independent contribution $\beta_{max}$;
  a minimum delay $\tau_{min}$ the packet of the flow experiences in the second network, wherein the minimum delay is a sum of a minimum $PDUV_{max}$ dependent contribution and a minimum $PDUV_{max}$ independent contribution $\beta_{min}$.

The means for providing 30 provides an indication of the at least one of the maximum $PDUV_{max}$ dependent contribution, the minimum $PDUV_{max}$ dependent contribution, the maximum $PDUV_{max}$ independent contribution, and the minimum $PDUV_{max}$ independent contribution to the first network (S30). In particular, the means for providing may provide such indication upon receiving a request from the first network.

In some embodiments, only the maximum delay is obtained. That is, it is disclosed an apparatus, comprising
  means for obtaining configured to obtain following parameters for a flow from a first network through a second network:
    a maximum protocol data unit volume $PDUV_{max}$ of the flow in the first network;
    a guaranteed flow bit rate GFBR of the flow in the second network; and
    a maximum protocol data unit delay budget $PDB_{max}$ of the flow in the second network;
  means for deriving configured to derive from the obtained parameters a maximum delay $\tau_{max}$ a packet of the flow experiences in the second network, wherein the maximum delay is a sum of a maximum $PDUV_{max}$ dependent contribution and a maximum $PDUV_{max}$ independent contribution $\beta_{max}$;
  means for providing configured to provide an indication of the at least one of the maximum $PDUV_{max}$ dependent contribution and the maximum $PDUV_{max}$ independent contribution $\beta_{max}$ to the first network.

In some embodiments, only the minimum delay is obtained. That is, it is disclosed an apparatus, comprising
  means for obtaining configured to obtain following parameters for a flow from a first network through a second network:
    a maximum protocol data unit volume $PDUV_{max}$ of the flow in the first network;
    a maximum flow bit rate MFBR of the flow in the second network;
    a minimum protocol data unit delay budget $PDB_{min}$ of the flow in the second network;
  means for deriving configured to derive from the obtained parameters a minimum delay $\tau_{min}$ the packet of the flow experiences in the second network, wherein the minimum delay is a sum of a minimum $PDUV_{max}$ dependent contribution and a minimum $PDUV_{max}$ independent contribution $\beta_{min}$;

means for providing configured to provide an indication of the at least one of the minimum $PDUV_{max}$ dependent contribution and the minimum $PDUV_{max}$ independent contribution $\beta_{min}$ to the first network.

Figure 8:
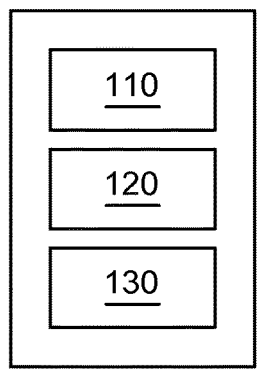
FIG. 8 shows an apparatus according to an embodiment of the invention.

FIG. 8 shows an apparatus according to an embodiment of the invention. The apparatus may be a network function such as a UPF or an element thereof. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for checking 110, means for monitoring 120, and means for informing 130. The means for checking 110, means for monitoring 120, and means for informing 130 may be an checking means, monitoring means, and informing means, respectively. The means for checking 110, means for monitoring 1120, and means for informing 30 may be a checker, monitor, and informer, respectively. The means for checking 110, means for monitoring 120, and means for informing 130 may be a checking processor, monitoring processor, and informing processor, respectively.

The means for checking 110 checks if a quality of service profile of a flow comprises an indication to control latency (S110). The indication includes an address of a mapping function.

The means for monitoring 120 monitors if a latency requirement set in the quality of service profile is not fulfilled for the flow (S120).

S110 and S120 may be performed in an arbitrary sequence. They may be performed fully or partly in parallel.

If the quality of service profile comprises the indication (S110="yes") and the requirement is not fulfilled (S120="yes"), the means for informing 130 informs the mapping function that the requirement is not fulfilled (S130).

Figure 10:
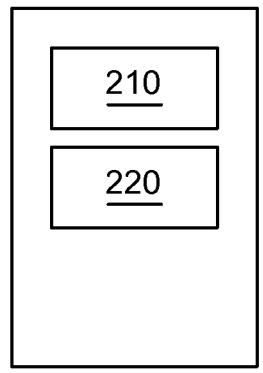
FIG. 10 shows an apparatus according to an embodiment of the invention.
Figure 11:
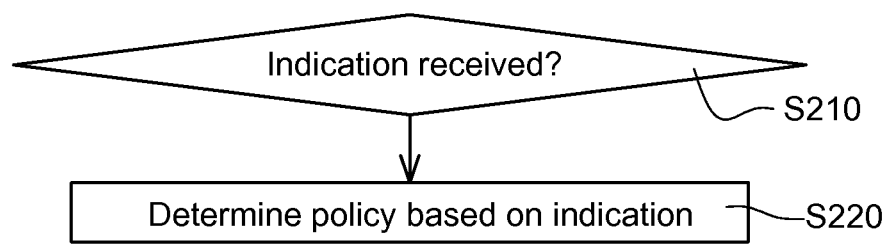
FIG. 11 shows a method according to an embodiment of the invention.

FIG. 10 shows an apparatus according to an embodiment of the invention. The apparatus may be a network function evaluating a QoS profile (such as a PCF, a network exposure function (NEF), a session management function (SMF), an access and mobility management function (AMF), or a user plane function (UPF), or their equivalents in other network generations), or an element thereof. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 210 and means for selecting 220. The means for monitoring 210 and means for selecting 220 may be a monitoring means, and selecting means, respectively. The means for monitoring 210 and means for selecting 220 may be a monitor and selector, respectively. The means for monitoring 210 and means for selecting 220 may be a monitoring processor and selecting processor, respectively.

The means for monitoring 210 monitors in a wireless network (such as a 3GPP network) if an indication for a flow is received (S210). The Indication indicates at least one of the following:

the flow carries time sensitive traffic (such as TSN traffic);
a maximum protocol data unit volume dependent contribution of an admissible latency of the flow;

a minimum protocol data unit volume dependent contribution of the admissible latency of the flow;
a maximum protocol data unit volume independent contribution of the admissible latency of the flow; and
a minimum protocol data unit volume independent contribution of the admissible latency of the flow.

If the indication is received (S210="yes"), the means for selecting 220 selects a policy for the flow according to the indication (S220).

Figure 12:
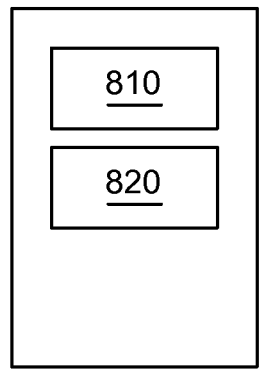
FIG. 12 shows an apparatus according to an embodiment of the invention.

FIG. 12 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform the method according to one of FIGS. 7, 9, and 11.

Some embodiments of the invention are described with respect to a 3GPP network. However, the invention is not limited to 3GPP networks. It may be applied to other wireless networks such as a WiFi network, too.

Some embodiments of the invention are described with respect to an industrial TSN network. However, the invention is not limited to industrial TSN networks. It may be applied to other (non-industrial) TSN networks such as Profinet and to other fixed line networks, too.

FIG. 2 shows an example where one of the TSN bridges is replaced by a 3GPP network embedded between TSN translator and TSN translator client. In some embodiments of the invention, one or more or even all bridges of the TSN network may be replaced by respective 3GPP networks embedded between respective TSN translator and TSN client. In case of plural replaced bridges, some or all of the respective 3GPP networks may be the same (i.e. one 3GPP network), wherein different replaced TSN bridges correspond to different sets of PDU sessions in the 3GPP network (i.e., a single TSN bridge corresponds to one set of PDU sessions, wherein each set may comprise one or more PDU sessions). In addition, the respective UE may be the same or different for different replaced TSN bridges.

In general, a bridge may comprise one or more TSN translators (corresponding to multiple sets of SMF, PCF and UPF), the core network and the radio access network and one or more UEs (terminal) of the wireless network (3GPP network), and one or more TSN translator clients. Each TSN translator client is related to one of the UEs. One UE may be related to one or more TSN translator clients. The TSN translator clients correspond to ports of a conventional bridge.

Embodiments of the invention are described based on the fully centralized configuration model in TSN networks which assumes existence of CUC and CNC [2]. The reason for such approach is that the centralized configuration model is regarded as the most efficient one for achieving the stringent timing requirements of industrial networks.

However, embodiments of this invention report may be applicable to other configuration models of TSN network. Namely:

In fully distributed model: the end stations communicate the stream requirement directly to the adjacent bridge over the TSN user/network protocol. According to such embodiments of the invention, the TSN Translator Client at the UE side may recognize and forward such requirements to the TSN Translator. The TSN Translator, having the interface to the M&O, can communicate the end station requirements to the M&O. The M&O configures the 3GPP bridge as described above by setting up according PDU sessions. Such configured 3GPP bridge acts further as a "regular" TSN bridge as defined by TSN fully distributed model (e.g. supporting propagation of schedule configuration information between Talkers/Listeners and bridges using TSN Translator and TSN Translator Client).

In centralized network/distributed user model: The M&O becomes aware of end user stream requirements in a similar way, i.e. the TSN Translator Client at the UE side communicates the issued stream requirements to the TSN Translator which signals them to the M&O. The M&O sets up the required PDU sessions of the 3GPP bridge which further acts as a "regular" TSN bridge according to the procedures defined in centralized model. E.g. the 3GPP bridge receives and executes the schedule configuration information as computed by CNC using TSN Translator. The TSN Translator and the TSN Translator Client are used for exchange of configuration information between Talkers/Listeners at UE side and 3GPP bridge.

The mapping function MF may be provided at each TSN translator. However, in some embodiments, several TSN translators may share one MF. For example, a (shared or unshared) MF may be deployed at the M&O.

Embodiments are described hereinabove wherein M&O provides the information about the (estimated/requested) QoS directly to the TSN translator. However, in some embodiments, M&O may provide this information to CNC which forwards it to the TSN translator. Thus, an interface between M&O and TSN translator may not be needed but an additional message exchange is required.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a translator, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a M&O, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:
    at least one processor; and
    at least one non-transitory memory storing instructions that, when executed by the at least one processor, cause the apparatus at least to:
    obtain parameters for a flow from a first network through a second network, the parameters comprising:
        a maximum protocol data unit volume of the flow in the first network;
        a maximum protocol data unit delay budget of the flow in the second network;
        a minimum protocol data unit delay budget of the flow in the second network;
    derive from the obtained parameters at least one of:
        a maximum protocol data unit volume dependent contribution and a maximum protocol data unit volume independent contribution; or
        a minimum protocol data unit volume dependent contribution and a minimum protocol data unit volume independent contribution;
    provide an indication of the at least one of the maximum protocol data unit volume dependent contribution, the minimum protocol data unit volume dependent contribution, the maximum protocol data unit volume independent contribution to the first network, or the minimum protocol data unit volume independent contribution to the first network; and
    classify the derived at least one of the maximum protocol data unit volume dependent contribution, the minimum protocol data unit volume dependent contribution, the maximum protocol data unit volume independent contribution, or the minimum protocol data unit volume independent contribution into one of a plurality of predefined quality of service classes of the second network;
    wherein the indication of the at least one of the maximum protocol data unit volume dependent contribution, the minimum protocol data unit volume dependent contribution, the maximum protocol data unit volume independent contribution, or the minimum protocol data unit volume independent contribution to the first network comprises an indication of the one of the plurality of predefined quality of service classes.

2. The apparatus of claim 1, wherein the instructions, when executed by the at least one processor, cause the apparatus to obtain:
    a source address of the flow in the second network; and
    a destination address of the data flow in the second network;
    where the circuitry configured to derive is further configured to derive:

an ingress port of the flow in the first network, wherein the ingress port corresponds to the source address according to a stored relationship; and an egress port of the flow in the first network, wherein the egress port corresponds to the destination address according to the stored relationship; and where the circuitry configured to provide is configured to provide, to the first network, an indication of at least one of the ingress port or the egress port along with the indication of the at least one of the maximum protocol data unit volume dependent contribution, the minimum protocol data unit volume dependent contribution, the maximum protocol data unit volume independent contribution, or the minimum protocol data unit volume independent contribution.

3. The apparatus according to claim 1, wherein the instructions, when executed by the at least one processor, cause the apparatus to derive at least one of:

a maximum delay $T_{max}$ a packet of the flow experiences in the second network, wherein the maximum delay is a sum of a maximum protocol data unit volume dependent contribution and a maximum protocol data unit volume independent contribution; or a minimum delay $T_{min}$ the packet of the flow experiences in the second network, wherein the minimum delay is a sum of a minimum protocol data unit volume dependent contribution and a minimum protocol data unit volume independent contribution.

4. The apparatus of claim 3, wherein the instructions, when executed by the at least one processor, cause the apparatus to derive the at least one of the maximum delay $T_{max}$ or the minimum delay $T_{min}$ according to the respective formula:

$$T_{max} - 1/GFBR * PDUV_{max} = \beta_{max};$$

$$T_{max} = PDB_{max};$$

$$T_{min} - 1/MFBR * PDUV_{max} = \beta_{min};$$

$$T_{min} = PDB_{min},$$

wherein $PDUV_{max}$ is the maximum protocol data unit volume;

wherein $PDB_{max}$ is the maximum protocol data unit delay budget, and $PDB_{min}$ is the minimum protocol data unit delay budget;

wherein $\beta_{max}$ is the maximum protocol data unit volume independent contribution, and $\beta_{min}$ is the minimum protocol data unit volume independent contribution;

wherein MFBR is a maximum flow bit rate of the flow in the second network, GFBR is a guaranteed flow bit rate of the flow in the second network;

such that the maximum protocol data unit volume dependent contribution is $1/GFBR * PDUV_{max}$, the minimum protocol data unit volume dependent contribution is $1/MFBR * PDUV_{max}$, the maximum protocol data unit volume independent contribution is $\beta_{max}$, and the minimum protocol data unit volume independent contribution is $\beta_{min}$.

5. The apparatus of claim 4, wherein at least one of GFBR, $PDUV_{max}$, $\beta_{max}$, $\beta_{min}$, MFBR, $PDB_{max}$, or $PDB_{min}$ is predefined, independent from the flow.

6. The apparatus of claim 4, wherein the instructions, when executed by the at least one processor, cause the apparatus to obtain at least one of GFBR, $PDUV_{max}$, $\beta_{max}$, $\beta_{min}$, MFBR, $PDB_{max}$, or $PDB_{min}$ for the flow from the respective network.

7. The apparatus of claim 1, wherein the maximum protocol data unit delay budget ($PDB_{max}$) is equal to the minimum protocol data unit delay budget ($PDB_{min}$) and the maximum protocol data unit volume independent contribution ($\beta_{max}$) is equal to the minimum protocol data unit volume independent contribution ($\beta_{min}$).

8. A method comprising:

obtaining following parameters for a flow from a first network through a second network:
   a maximum protocol data unit volume of the flow in the first network;
   a maximum protocol data unit delay budget of the flow in the second network;
   a minimum protocol data unit delay budget of the flow in the second network;

deriving from the obtained parameters at least one of:
   a maximum protocol data unit volume dependent contribution and a maximum protocol data unit volume independent contribution; or
   a minimum protocol data unit volume dependent contribution and a minimum protocol data unit volume independent contribution;

providing an indication of the at least one of the maximum protocol data unit volume dependent contribution, the minimum protocol data unit volume dependent contribution, the maximum protocol data unit volume independent contribution to the first network, or the minimum protocol data unit volume independent contribution to the first network; and classifying the derived at least one of the maximum protocol data unit volume dependent contribution, the minimum protocol data unit volume dependent contribution, the maximum protocol data unit volume independent contribution, or the minimum protocol data unit volume independent contribution into one of a plurality of predefined quality of service classes of the second network;

wherein the indication of the at least one of the maximum protocol data unit volume dependent contribution, the minimum protocol data unit volume dependent contribution, the maximum protocol data unit volume independent contribution, or the minimum protocol data unit volume independent contribution to the first network comprises an indication of the one of the plurality of predefined quality of service classes.

9. The method of claim 8, further comprising:

obtaining:
   a source address of the flow in the second network;
   a destination address of the data flow in the second network;

deriving:
   an ingress port of the flow in the first network, wherein the ingress port corresponds to the source address according to a stored relationship;
   an egress port of the flow in the first network, wherein the egress port corresponds to the destination address according to the stored relationship;

providing, to the first network, an indication of at least one of the ingress port and the egress port along with the indication of the at least one of the maximum protocol data unit volume dependent contribution, the minimum protocol data unit volume dependent contribution, the maximum protocol data unit volume independent contribution, or the minimum protocol data unit volume independent contribution.

10. The method of claim 8, further comprising deriving at least one of:

a maximum delay $T_{max}$ a packet of the flow experiences in the second network, wherein the maximum delay is a sum of a maximum protocol data unit volume dependent contribution and a maximum protocol data unit volume independent contribution βmax; or a minimum delay $T_{min}$ the packet of the flow experiences in the second network, wherein the minimum delay is a sum of a minimum protocol data unit volume dependent contribution and a minimum protocol data unit volume independent contribution $\beta_{min}$.

11. The method of claim 10, wherein the at least one of the maximum delay $T_{max}$ or the minimum delay $T_{min}$ is derived according to the respective formula:

$$T_{max}-1/GFBR*PDUV_{max}=\beta_{max};$$

$$T_{max}=PDB_{max};$$

$$T_{min}-1/MFBR*PDUV_{max}=\beta_{min};$$

$$T_{min}=PDB_{min},$$

wherein $PDUV_{max}$ is the maximum protocol data unit volume;

wherein $PDB_{max}$ is the maximum protocol data unit delay budget, and $PDB_{min}$ is the minimum protocol data unit delay budget;

wherein $\beta_{max}$ is the maximum protocol data unit volume independent contribution, and $\beta_{min}$ is the minimum protocol data unit volume independent contribution;

wherein MFBR is a maximum flow bit rate of the flow in the second network, GFBR is a guaranteed flow bit of the flow in the second network;

such that the maximum protocol data unit volume dependent contribution is $1/GFBR*PDUV_{max}$, the minimum protocol data unit volume dependent contribution is $1/MFBR*PDUV_{max}$, the maximum protocol data unit volume independent contribution is $\beta_{max}$, and the minimum protocol data unit volume independent contribution is $\beta_{min}$.

12. The method of claim 11, wherein at least one of GFBR, $PDUV_{max}$, $\beta_{max}$, $\beta_{min}$, MFBR, $PDB_{max}$, or $PDB_{min}$ is predefined, independent from the flow.

13. The method of claim 11, wherein at least one of GFBR, $PDUV_{max}$, $\beta_{max}$, $\beta_{min}$, MFBR, $PDB_{max}$, or $PDB_{min}$ for the flow is obtained from the respective network.

14. The method of claim 8, wherein the maximum protocol data unit delay budget ($PDB_{max}$) $PDB_{max}$ is equal to the minimum protocol data unit delay budget ($PDB_{min}$) and the maximum protocol data unit volume independent contribution ($\beta_{max}$) is equal to the minimum protocol data unit volume independent contribution($\beta_{min}$).

15. A computer program product comprising a non-transitory memory having a set of instructions which, when executed on an apparatus, is configured to cause the apparatus to carry out operations comprising:
    obtaining parameters for a flow from a first network through a second network, the parameters comprising:
        a maximum protocol data unit volume of the flow in the first network;
        a maximum protocol data unit delay budget of the flow in the second network; and
        a minimum protocol data unit delay budget of the flow in the second network;
    deriving from the obtained parameters at least one of:
        a maximum protocol data unit volume dependent contribution and a maximum protocol data unit volume independent contribution; or
        a minimum protocol data unit volume dependent contribution and a minimum protocol data unit volume independent contribution;
    providing an indication of the at least one of the maximum protocol data unit volume dependent contribution, the minimum protocol data unit volume dependent contribution, the maximum protocol data unit volume independent contribution to the first network, or the minimum protocol data unit volume independent contribution to the first network; and
    classifying the derived at least one of the maximum protocol data unit volume dependent contribution, the minimum protocol data unit volume dependent contribution, the maximum protocol data unit volume independent contribution, or the minimum protocol data unit volume independent contribution into one of a plurality of predefined quality of service classes of the second network;
    wherein the indication of the at least one of the maximum protocol data unit volume dependent contribution, the minimum protocol data unit volume dependent contribution, the maximum protocol data unit volume independent contribution, or the minimum protocol data unit volume independent contribution to the first network comprises an indication of the one of the plurality of predefined quality of service classes.

16. The computer program product of claim 15, embodied as a computer-readable medium or directly loadable into a computer.

* * * * *